(12) United States Patent
Boronvinskih et al.

(10) Patent No.: US 9,691,110 B2
(45) Date of Patent: Jun. 27, 2017

(54) METHOD AND SYSTEM FOR PROVIDING AUTOMATED HIGH SCALE FABRICATION OF CUSTOM ITEMS

(75) Inventors: Artem Boronvinskih, Moscow (RU); Qinghui Lu, San Jose, CA (US); Maneesh Dhagat, San Jose, CA (US); Shiva P. Sambu, Santa Clara, CA (US); Evgeny Timofeyev, Cheboksary (RU); Dmitry Sultanov, Moscow (RU); Anton Spiridonov, Moscow (RU); Ivan Ionov, Moscow (RU); Sergey Nikolskiy, Moscow (RU); Vasily Ivanov, Moscow (RU); Alexey Vishnevskiy, Moscow (RU)

(73) Assignee: Align Technology, Inc., San Jose, CA (US)

( * ) Notice: Subject to any disclaimer, the term of this patent is extended or adjusted under 35 U.S.C. 154(b) by 124 days.

(21) Appl. No.: 13/085,079

(22) Filed: Apr. 12, 2011

(65) Prior Publication Data

US 2011/0213483 A1  Sep. 1, 2011

Related U.S. Application Data

(62) Division of application No. 11/681,615, filed on Mar. 2, 2007, now Pat. No. 7,957,824.

(51) Int. Cl.
*G06Q 50/00* (2012.01)
*G06Q 50/04* (2012.01)

(52) U.S. Cl.
CPC .............. *G06Q 50/04* (2013.01); *Y02P 90/30* (2015.11)

(58) Field of Classification Search
None
See application file for complete search history.

(56) References Cited

U.S. PATENT DOCUMENTS

| 4,554,635 | A | * | 11/1985 | Levine | G06F 17/509 700/163 |
|---|---|---|---|---|---|
| 4,870,592 | A | * | 9/1989 | Lampi et al. | 700/112 |
| 5,378,218 | A | * | 1/1995 | Daimaru et al. | 483/9 |
| 6,629,003 | B1 | * | 9/2003 | Frizzell et al. | 700/97 |
| 6,690,990 | B1 | * | 2/2004 | Caron | B27G 1/00 144/363 |
| 7,031,795 | B2 | | 4/2006 | Chao et al. | |
| 7,089,082 | B1 | * | 8/2006 | Lukis | G05B 19/4097 264/453 |
| 7,293,988 | B2 | * | 11/2007 | Wen | 433/24 |
| 7,957,824 | B2 | | 6/2011 | Boronvinskih et al. | |
| 2002/0154114 | A1 | | 10/2002 | Christensen et al. | |

(Continued)

OTHER PUBLICATIONS

William W. Chow, "Nesting of a single shape on a strip," Int. J. Prod. Res., vol. 17, No. 4, pp. 305-322, 1979.*

(Continued)

*Primary Examiner* — Christopher E Everett
(74) *Attorney, Agent, or Firm* — Klein, O'Neill & Singh, LLP

(57) ABSTRACT

Method and system for providing volume manufacturing of customizable items including receiving a data package including a plurality of manufacturing parameters, each of the plurality of manufacturing parameters associated with a unique item, verifying the received data package, and implementing a manufacturing process associated with the received data package is provided.

11 Claims, 10 Drawing Sheets

(56) References Cited

U.S. PATENT DOCUMENTS

| | | | |
|---|---|---|---|
| 2003/0130755 A1 | 7/2003 | Bazzocchi et al. | |
| 2003/0203334 A1* | 10/2003 | Hedge et al. | 433/53 |
| 2005/0082703 A1* | 4/2005 | Wrosz | 264/16 |
| 2005/0122346 A1* | 6/2005 | Horn | G06F 17/50 345/629 |
| 2005/0203658 A1 | 9/2005 | Chao et al. | |
| 2006/0093982 A1* | 5/2006 | Wen | 433/6 |
| 2006/0093992 A1* | 5/2006 | Wen | 433/213 |
| 2006/0121408 A1* | 6/2006 | Hedge et al. | 433/53 |
| 2006/0127851 A1* | 6/2006 | Wen | 433/213 |
| 2006/0127855 A1* | 6/2006 | Wen | 433/213 |
| 2006/0127856 A1* | 6/2006 | Wen | 433/213 |
| 2006/0185143 A1 | 8/2006 | Frauen et al. | |
| 2006/0200270 A1* | 9/2006 | Lukis | B29C 33/3835 700/197 |
| 2007/0048689 A1* | 3/2007 | Holzner | A61C 13/0004 433/229 |
| 2008/0099381 A1* | 5/2008 | Culp et al. | 209/577 |

OTHER PUBLICATIONS

Office Action from USPTO dated Sep. 30, 2009 for related U.S. Appl. No. 11/681,615.

Final Office Action from USPTO dated Jan. 20, 2010 for related U.S. Appl. No. 11/681,615.

Notice of Allowance from USTPO dated Jan. 20, 2011 for related U.S. Appl. No. 11/681,615.

Office Action from USPTO dated May 9, 2012 for related U.S. Appl. No. 13/085,349.

Final Office Action from USPTO dated Aug. 15, 2012 for related U.S. Appl. No. 13/085,349.

Office Action from USPTO dated Apr. 25, 2013 for related U.S. Appl. No. 13/085,349.

Notice of Allowance from USPTO dated Aug. 27, 2013 for related U.S. Appl. No. 13/085,349.

* cited by examiner

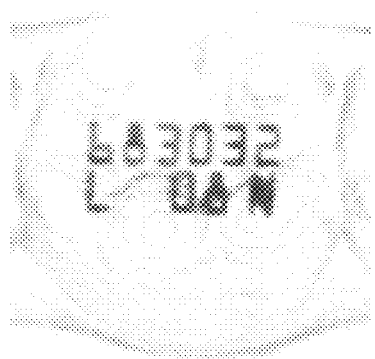
FIGURE 12
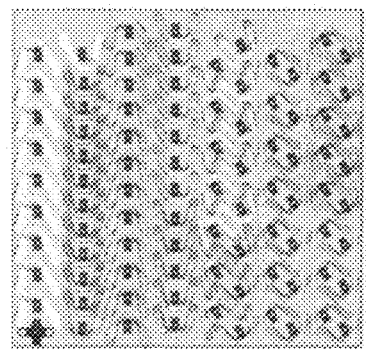 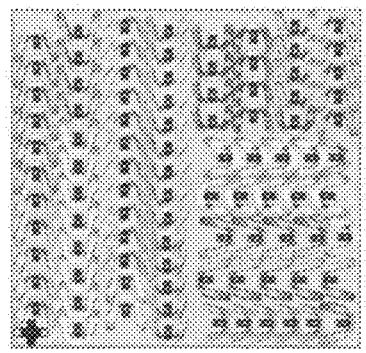
FIGURE 13A  FIGURE 13B

METHOD AND SYSTEM FOR PROVIDING AUTOMATED HIGH SCALE FABRICATION OF CUSTOM ITEMS

CROSS REFERENCE TO RELATED APPLICATIONS

This application is a divisional application of application Ser. No. 11/681,615, filed Mar. 2, 2007, now U.S. Pat. No. 7,957,824, the disclosure of which is incorporated herein in its entirety.

FIELD OF THE INVENTION

The present invention is related generally to the field of manufacturing. More specifically, the present invention is related to methods and system for providing high scale automated manufacturing of unique items including dental aligners.

BACKGROUND

Traditional methods of dental mold making are well known, such as those described in Graber, Orthodontics: Principle and Practice, Second Edition, Saunders, Philadelphia, 1969, pp. 401 415. Typically, these methods involve forming an impression of the patient's dentition using a suitable impression material, such as alginate or polyvinylsiloxane (PVS). Impressions of the upper jaw typically include the teeth, the palate and gingival tissue surrounding the teeth on the facial and lingual surfaces. Impressions of the lower jaw typically include the teeth and gingival tissue surrounding the teeth on the facial and lingual surfaces. Plaster is then poured into the impression to form a relief of the dental features. The relief is a permanent, three-dimensional mold of the dentition and oral tissues.

Improved methods of mold making include rapid prototyping. Rapid prototyping is a technology which has developed in the last decade. Through the use of modern solid modeling CAD packages, combined with laser systems and new materials, solid parts may now be generated directly from a computer model. Examples of this technology include stereolithography (SLA), laminate object manufacturing (LOM), and fused deposition modeling (FDM), to name a few.

Stereolithography is a method that employs an ultraviolet laser to cure a thin layer of liquid plastic into a solid. The process operates by taking a thin layer of the light-sensitive liquid plastic and passing the laser beam over the points where the part is solid. Once a pass is completed, another layer of the liquid is added to the existing part, and the process repeats until the full part height is achieved. SLA parts are extremely accurate, and tend to have excellent surface finishes. A variety of SLA materials are available for different purposes, including waxes, plastics, and flexible elastomers.

Laminate object manufacturing builds a part by taking individual sheets of paper that have a layer of glue on one side and building up successive sections of a part. As each layer is laid down, a laser beam passes over the edges of the part, detailing the part and separating the part from the excess material. In addition, the laser beam creates a grid throughout the excess material. After the final sheet is laid down, the part may be separated from the excess material by removing cubes of the grid in a systematic fashion. LOM parts are accurate, and very easy to sand and paint. LOM parts also have different strengths in different directions due to the paper layers.

Fused deposition modeling is a process that most closely resembles a miniature glue gun. In fused deposition modeling, a heat softening and curing plastic is melted in a small nozzle which puts down a very fine bead wherever the solid part is supposed to be. FDM parts have a rougher surface finish than an SLA part, but typically are stronger and more durable. In all cases, parts created by rapid prototyping methods are generated relatively quickly and are accurate to a few thousandths of an inch.

Producing a dental mold with rapid prototyping methods requires the use of a computerized model or digital data set representing the dental geometry and tooth configuration. The model is used to guide the mold making process to produce a replica or relief of the computerized model. The resulting relief is a three-dimensional mold of the dentition. This method of making dental molds is particularly applicable to situations in which multiple molds are needed to be produced. In this case, one computerized model may be used to make a number of molds in an automated fashion. In addition, this method is applicable to situations in which a mold of a tooth arrangement which differs from the patient's current tooth arrangement is needed to be produced or molds of multiple tooth arrangements which differ from each other and the patient need to be produced. In either case, the computerized model of the patient's teeth may be manipulated to portray each new tooth arrangement and a mold may be produced to reflect each successive arrangement. This may be repeated any number of times to derive a number of molds with differing tooth arrangements. Such techniques may speed production time and reduce costs by eliminating the need for repeated casting and artistic resetting of teeth in traditional mold manufacturing.

Series of dental molds, such as those described above, may be used in the generation of elastic repositioning appliances for a new type of orthodontic treatment being developed by Align Technology, Inc., Santa Clara, Calif., assignee of the present application. Such appliances are generated by thermoforming a thin sheet of elastic material over a mold of a desired tooth arrangement to form a shell. The shell of the desired tooth arrangement generally conforms to a patient's teeth but is slightly out of alignment with the initial tooth configuration. Placement of the elastic positioner over the teeth applies controlled forces in specific locations to gradually move the teeth into the desired configuration. Repetition of this process with successive appliances comprising new configurations eventually moves the teeth through a series of intermediate configurations to a final desired configuration. A full description of an exemplary elastic polymeric positioning appliance is described in U.S. Pat. No. 5,975,893, and in published PCT application WO 98/58596 which designates the United States and which is assigned to the assignee of the present invention. Both documents are incorporated by reference for all purposes.

To carry out such orthodontic treatment, a series of computer models or digital data sets will be generated, stored and utilized to fabricate a series of representative dental molds. Typically, only the digital information related to the tooth arrangement will be stored due to cost and space limitations. However, to form a properly fitting elastic repositioning appliance or other dental appliance, it will at times be necessary to include in the mold a patient's oral soft tissue, such as a palate, facial gingival tissue and/or lingual gingiva tissue. This may be the case when adding accessories to a basic elastic repositioning shell, such as palatal bars, lingual flanges, lingual pads, buccal shields, buccinator bows or wire shields, a full description of which is described in U.S. Provisional Patent Application No. 60/199,649 filed Apr. 25, 2000, and the full disclosure is hereby incorporated by reference for all purposes. These accessories may contact or interact with portions of the soft tissue requiring a mold of such tissues to properly position the accessory in or on the appliance. In addition, this may be the case when producing traditional orthodontic retainers and positioners. Traditional appliances may be used as part of an orthodontic treatment plan utilizing elastic repositioning appliances, particularly in the final stages of treatment. During such stages, for example, any residual intrusion of the teeth due to the presence of elastic appliances may be corrected with the use of a traditional retainer. Such retainers typically comprise a polymeric replica of the palate or portions of the gingiva which support metal wires which wrap around the perimeter of the teeth.

Existing fabrication systems are generally run manually by generating a report of cases and providing it into the fabrication software. Such fabrication systems had several disadvantages. First, each mold was not uniquely identifiable. Second, the molds were created with problems of holes, free-floating island structures, and unstable peninsula structures. Third, the molds were too tall and used more resin than required. Fourth, the molds were not packed efficiently on a tray. Fifth, laser marks were sometimes not sharp.

Thus, a need exists to promptly process treated three-dimensional ("3D") jaw and teeth data to create, in an automated manner, 3D mold data for manufacturing. Also created would be a 3D cutting path for automated cutting of aligners and 3D placement data for automated laser marking of aligners. These are to be achieved while minimizing resin used to build a mold, minimizing time to build a tray of molds, maximizing automation by reducing manual cutting of aligner, manual laser marking and errors.

In view of the foregoing, it would be desirable to have methods and systems to provide an automated or semi-automated manufacturing or fabrication process for high volume and high scale customized items such as dental aligners.

SUMMARY OF THE INVENTION

In view of the foregoing, in accordance with the various embodiments of the present invention, there are provided methods and system for providing high scale and high volume automated fabrication process for customized items including, for example, dental aligners, customized footwear, customized garment, customized eye wear (including, for example, contact lenses, and sunglasses), and any other customized or unique items that require unique parameters or specification for manufacturing.

Accordingly, a method of providing volume manufacturing of items in one embodiment of the present invention includes receiving a data package including a plurality of manufacturing parameters, each of the plurality of manufacturing parameters associated with a unique item, verifying the received data package, and implementing a manufacturing process associated with the received data package.

These and other features and advantages of the present invention will be understood upon consideration of the following detailed description of the invention and the accompanying drawings.

BRIEF DESCRIPTION OF THE DRAWINGS

FIG. 12 is a three-dimensional representation of identification information of FIG. 8 in accordance with one embodiment of the present invention; and FIGS. 13A-13B are visual illustrations of a column oriented and recursive layouts, respectively, of the optimal tray layout of FIG. 9 in accordance with one embodiment of the present invention.

DETAILED DESCRIPTION

Figure 1A:
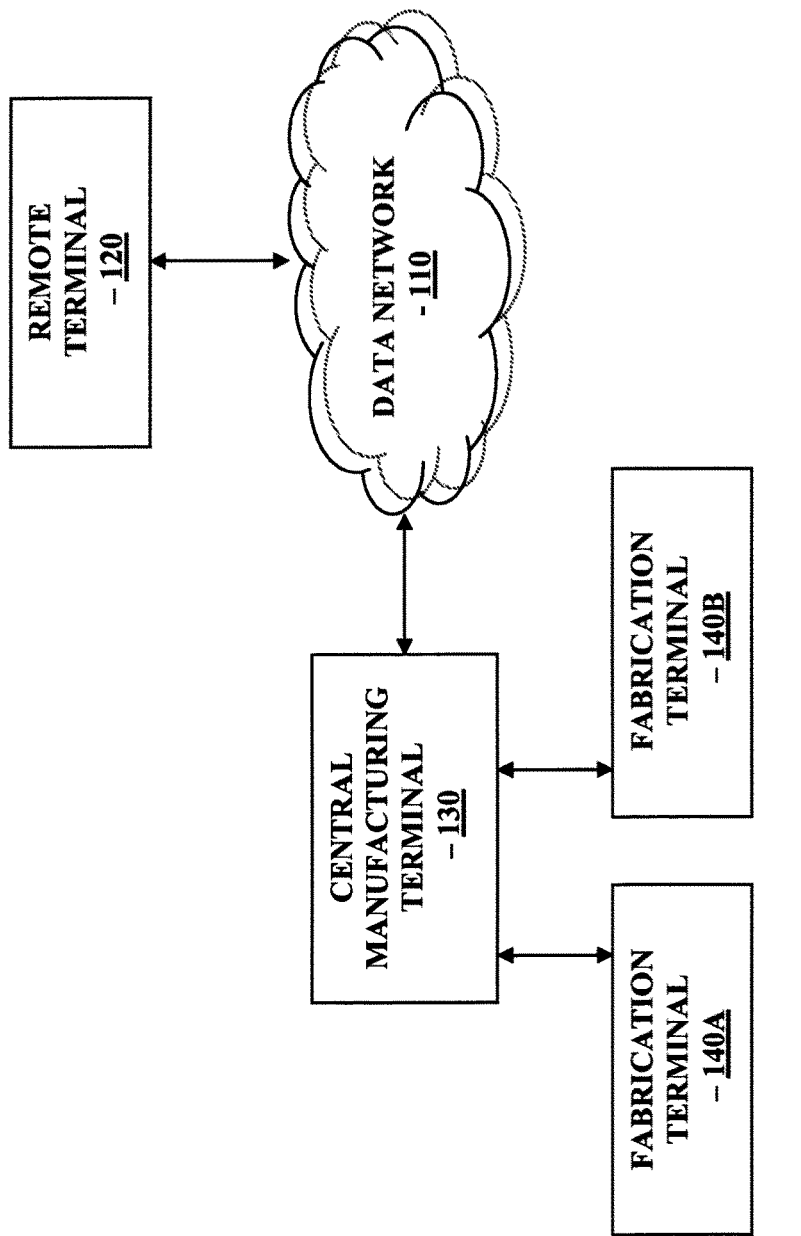
FIG. 1A is a block diagram of the overall fabrication system for practicing the various embodiments of the present invention.

FIG. 1A is a block diagram of the overall fabrication system for practicing the various embodiments of the present invention. Referring to FIG. 1 A, in one embodiment of the present invention, the fabrication system 100 includes a data network 110, a remote terminal 120 and a central manufacturing terminal 130. The central manufacturing terminal 130 and the remote terminal 120 are each operatively coupled to the data network 110 for bi-directional communication. In one embodiment, the data network 110 includes one or more of a public data network such as the internet, a private data network including, for example, an intranet, a local area network (LAN), a wide area network (WAN), or any other data network that provides for secure data communication including data encryption and the like.

Referring to FIG. 1A, the fabrication system 100 further includes a plurality of fabrication terminals 140A, 140B, each of which are operatively coupled to the central manufacturing terminal 130. In one embodiment, each of the plurality of fabrication terminals 140A, 140B may be configured to perform one or more dedicated processing to support the fabrication process. Alternatively, the one or more of the fabrication terminals 140A, 140B may be configured to perform duplicate fabrication processing to provide redundancy in case of failure of one or more fabrication terminals 140A, 140B. While two fabrication terminals 140A, 140B are shown in FIG. 1A, within the scope of the present invention, additional fabrication terminals may be provided, each configured to communicate with the central manufacturing terminal 130, and further, each additional fabrication terminal configured to perform one or more dedicated or redundant fabrication processing.

Referring yet again to FIG. 1A, the remote terminal 120 may be configured as a personal computer, a workstation, or a server terminal, a handheld mobile device or any other suitable device configured to support data communication with the data network 110 and related data processing, and further, configured to communicate with the central manufacturing terminal 130 in the fabrication system 100. Likewise, in one embodiment, the central manufacturing terminal 130 and each of the fabrication terminals 140A, 140B may be configured as a personal computer, a workstation, a server terminal, a handheld mobile device or any other suitable device configured to support data communication and related processing in the fabrication system 100.

For example, in one embodiment, as discussed in further detail below, the remote terminal 120 may be configured to support manufacturing execution system (MES) which monitors a customer order for the customized items such as dental appliances, from the initial order placement, through manufacturing and shipping to the customer. In addition, the remote terminal 120 may also be configured to support executable programs for processing and generating appropriate fabrication related data files and formats. More specifically, in one embodiment, the remote terminal 120 may be configured to support and execute ClinCheck® software which, for example, provides for electronic dental treatment plan generation and data files (for example, the ADF file format corresponding to three-dimensional data format for jaw and teeth representation) associated with the manufacturing of the dental appliances for the dental treatment.

Figure 1B:
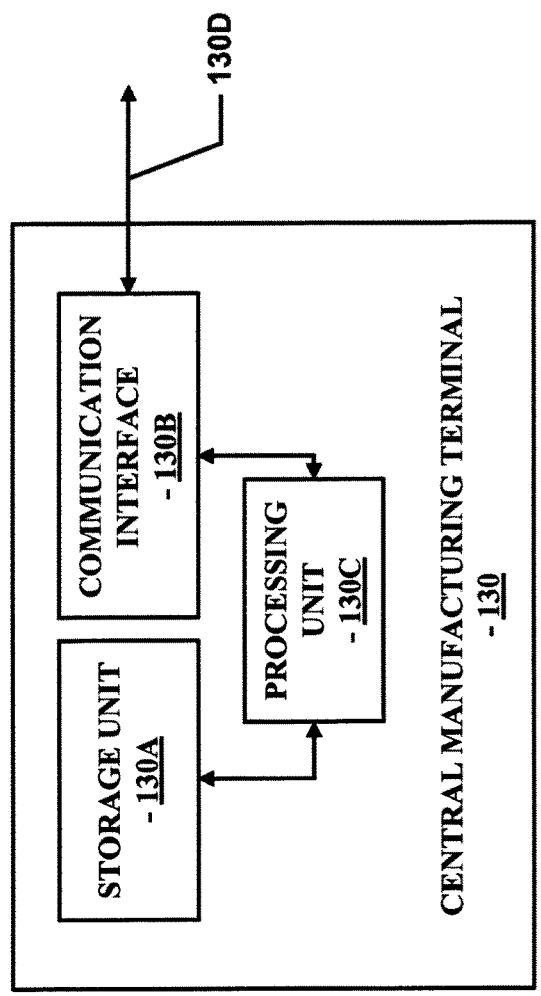
FIG. 1B is a block diagram of the central manufacturing terminal of the overall fabrication system of FIG. 1A in accordance with one embodiment of the present invention.

FIG. 1B is a block diagram of the central manufacturing terminal of the overall fabrication system of FIG. 1A in accordance with one embodiment of the present invention. Referring to FIG. 1B, the central manufacturing terminal 130 in one embodiment includes a storage unit 130A, a communication interface 130B and a processing unit 130C operatively coupled to the storage unit 130A and the communication interface 130B.

Referring to FIG. 1B, the storage unit 130A in one embodiment may be configured to provide persistent (nonvolatile) storage for program and data files, and may include at least one hard disk drive and at least one CD-ROM drive (with associated removable media). There may also be other devices such as a floppy disk drive and optical drives (all with their associated removable media). In addition, the storage unit 130A may include drives of the type with removable media cartridges, such as hard disk cartridges and flexible disk cartridges. In one aspect of the present invention, the processing unit 130C may be configured to access software stored in the storage unit 130A based on and in response to the input command or request received via the communication interface 130B to perform corresponding associated processing based on procedures and/or routines in accordance with the instructions or input information received via the communication interface 130B.

Referring again to FIG. 1B, the communication interface 130B in one embodiment is operatively coupled to a communication link 130D for transmitting and/or receiving data including instructions associated with the operation of the central manufacturing terminal 130. In one embodiment, the communication link 130D may include wired or wireless communication link for bi-directional communication with remote terminal 120 over the data network 110, and further, with the one or more fabrication terminals 140A, 140B.

Referring back to FIG. 1A, while not shown, in one embodiment of the present invention, each of the remote terminal 120, and the one or more fabrication terminal 140A, 140B may be configured with one or more processing units, one or more storage units, and one or more communication interface similar to those respective components shown in FIG. 1B in conjunction with the central manufacturing terminal 130, for performing the dedicated or associated functions in conjunction with the respective data processing and communication in the fabrication system 100.

Figure 2:
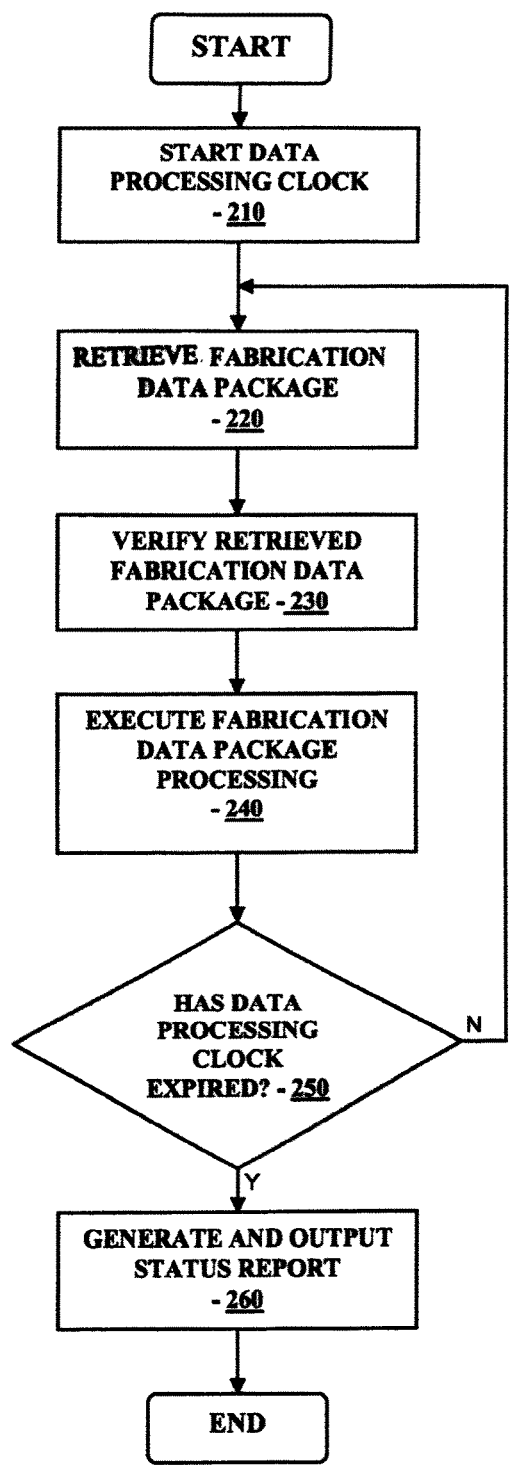
FIG. 2 is a flowchart illustrating the automated fabrication procedure performed by the central manufacturing terminal of the overall fabrication system of FIG. 1A in accordance with one embodiment of the present invention.

FIG. 2 is a flowchart illustrating the automated fabrication procedure performed by the central manufacturing terminal of the overall fabrication system of FIG. 1A in accordance with one embodiment of the present invention. Referring to FIG. 2, in one embodiment, at step 210, a data processing clock of the central manufacturing terminal 130 (FIG. 1B), for example, in the processing unit 130C of the central manufacturing terminal 130 is initiated. More specifically, in one embodiment, a predetermined fabrication processing stop time, or alternatively, a predefined fabrication processing time period (as may be defined or pre-programmed in the central manufacturing terminal 130) is initiated.

Referring to FIG. 2, at step 220, the fabrication data package is retrieved from, for example, the remote terminal 120 (FIG. 1A) over the data network 110. That is, at the time of initiating the data processing clock, the data package at the remote terminal 120 is prepared and finalized for transmission to the central manufacturing terminal 130. In one embodiment, the data package may include a predefined data format such as ADF files which provides associated three-dimensional data representation of the jaw and teeth for each treatment profile for each patient for purposes of manufacturing and processing of the molds including the cutting and laser marking of the aligners. In one embodiment, the data package is processed by manufacturing execution system resident in the remote terminal 120 and which is configured to monitor customer orders from the initial order placement to the order shipment to the customer.

Referring again to FIG. 2, upon retrieving the fabrication data package, at step 230, the retrieved fabrication data package is verified at step 230 for accuracy to ensure, for example, that the fabrication data package includes all data associated with each customer order and the associated treatment profile for fabrication processing including accuracy and completeness of all stages of each treatment profile for fabrication processing. Upon verification of the retrieved fabrication data package, the fabrication processing is executed at step 240 for the retrieved fabrication data package. Upon verification of the retrieved fabrication data package, the central manufacturing terminal 130 in one embodiment is configured to generate a notification message confirming the verification of the received fabrication data package and to transmit the notification to the remote terminal 120.

During fabrication processing, the central manufacturing terminal 130 in one embodiment may be configured to generate a status report and output to the remote terminal 120 to update the remote terminal 120 on the fabrication processing status of the retrieved fabrication data package. Periodically, at predetermined intervals, the central manufacturing terminal 130 may be configured to generate input data for use during the later stages in the manufacturing line. For example, in particular embodiments, the central manufacturing terminal 130 may be configured to generate identification of the three-dimensional mold objects data, location of the cutting program, and location of the laser marking data for use during later stages in the manufacturing line.

Referring still again to FIG. 2, at step 250, it is determined whether the data processing clock initiated at step 210 has expired. If it is determined that the data processing clock associated with the fabrication processing has not elapsed, then the procedure returns to step 220 to retrieve additional fabrication data package for processing by the central manufacturing terminal 130. More specifically, in one embodiment, the fabrication process of the central manufacturing terminal 130 is optimized so as to utilize the processing capacity for handling high volume manufacturing processing so as to optimize the processing load of the central manufacturing terminal 130 and the one or more fabrication terminals 140A, 140B. That is, as discussed in further detail below, in one embodiment, the central manufacturing terminal 130 is configured to monitor the status of the fabrication data package processing, and when it is determined that the fabrication data package processing is nearing completion in the processing cycle, the central manufacturing terminal 130 may be configured to prompt the remote terminal 120 to retrieve additional fabrication data packages for manufacturing processing. In this manner, in one embodiment, the operational status of the one or more fabrication terminals 140A, 140B are monitored to minimize idle time, and further to optimize the fabrication processing load of the fabrication system 100.

Referring back to FIG. 2, if at step 250 it is determined that the data processing clock has expired or, if it is determined that the predefined processing time period has elapsed, the central manufacturing terminal 130 in one embodiment is configured to generate a status report and output to the remote terminal 120 to update the remote terminal 120 on the fabrication processing status of the retrieved fabrication data package. In a further embodiment, the central manufacturing terminal 130 may be configured to archive or backup all data or information received and/or processed by the central manufacturing terminal 130, to generate a final input data for use during later stages in the manufacturing line. For example, in particular embodiments, the archived or backed up data or information may include identification of the three-dimensional mold objects data, location of the cutting program, or location of the laser marking data.

In one embodiment of the present invention, the central manufacturing terminal 130 may be configured to periodically generate and transmit a status report or notification to the remote terminal 120 for each of the fabrication data package retrieved and executed for processing. More specifically, in one embodiment, the central manufacturing terminal 130 may be configured to generate a status notification at a predetermined time interval for each fabrication data package in the manufacturing process, or alternatively (or in addition to), the central manufacturing terminal 130 may be configured to generate and transmit a status report of the fabrication data package in manufacturing process based on the detection of a predefined error condition associated with the fabrication data package. In this manner, in the case where the predefined error condition requires modification to the data package, the error condition may be addressed at the remote terminal 120, for example, and communicated to the central manufacturing terminal 130 substantially contemporaneous to the detection of the error condition so that the manufacturing process is optimized with minimal idle or downtime.

Figure 3:
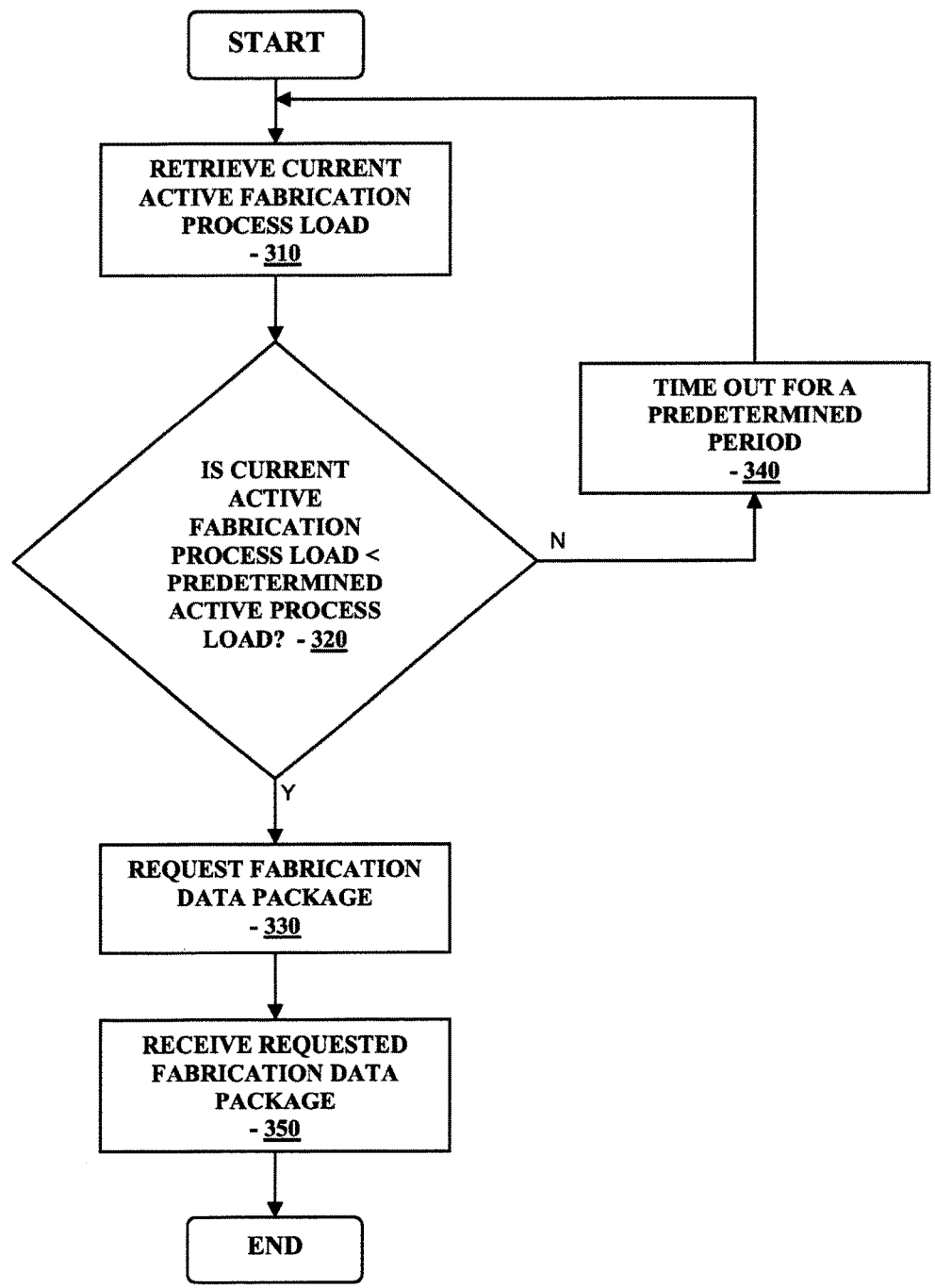
FIG. 3 is a flowchart illustrating the fabrication data package retrieval procedure of FIG. 2 in accordance with one embodiment of the present invention.

FIG. 3 is a flowchart illustrating the fabrication data package retrieval procedure of FIG. 2 in accordance with one embodiment of the present invention. Referring to FIG. 3, in one embodiment, a current active fabrication process load associated with the retrieved fabrication data package is retrieved at step 310 by the central manufacturing terminal 130 from the remote terminal 120. Thereafter at step 320, it is determined whether the retrieved current active fabrication process load is less than a predetermined active process load of the fabrication system 100 (FIG. 1A). In one embodiment, the predetermined active process load of the fabrication system 100 may be defined or established by the central manufacturing terminal 130 based on, for example, the operational status of the one or more fabrication terminals 140A, 140B in the fabrication system 100.

Referring to FIG. 3, if it is determined that the current active fabrication process load is not less that the predetermined active process load, then the routine is timed out for a predetermined time period at step 340, and then the routine returns to step 310. That is, if it is determined that the fabrication processing is at a predefined optimal manufacturing process status based on the retrieved fabrication data package, the central manufacturing terminal 130 in one embodiment is configured to not request additional fabrication data package for the current or active manufacturing cycle. On the other hand, referring again to FIG. 3, if it is determined that the current active fabrication process load is less than the predetermined active process load of the fabrication system 100 for the current manufacturing cycle, then at step 330, additional fabrication data package request is transmitted to the remote terminal 120 (FIG. 1A) to optimize the current manufacturing cycle processing load, and in response thereto, the requested additional fabrication data package is received at step 350 by the central manufacturing terminal 130.

In this manner, in one embodiment of the present invention, the central manufacturing terminal 130 is configured to initiate the fabrication process based on the received fabrication data package when sufficient fabrication data package is received from the remote terminal 120. As such, the manufacturing cycle processing load may be optimized in one embodiment to initiate the fabrication process when sufficient fabrication data package is received. Indeed, the fabrication system 100 in one embodiment may be configured to initiate the manufacturing process associated with the fabrication data package to take advantage of the processing volume which the fabrication system 100 is configured to support.

Figure 4:
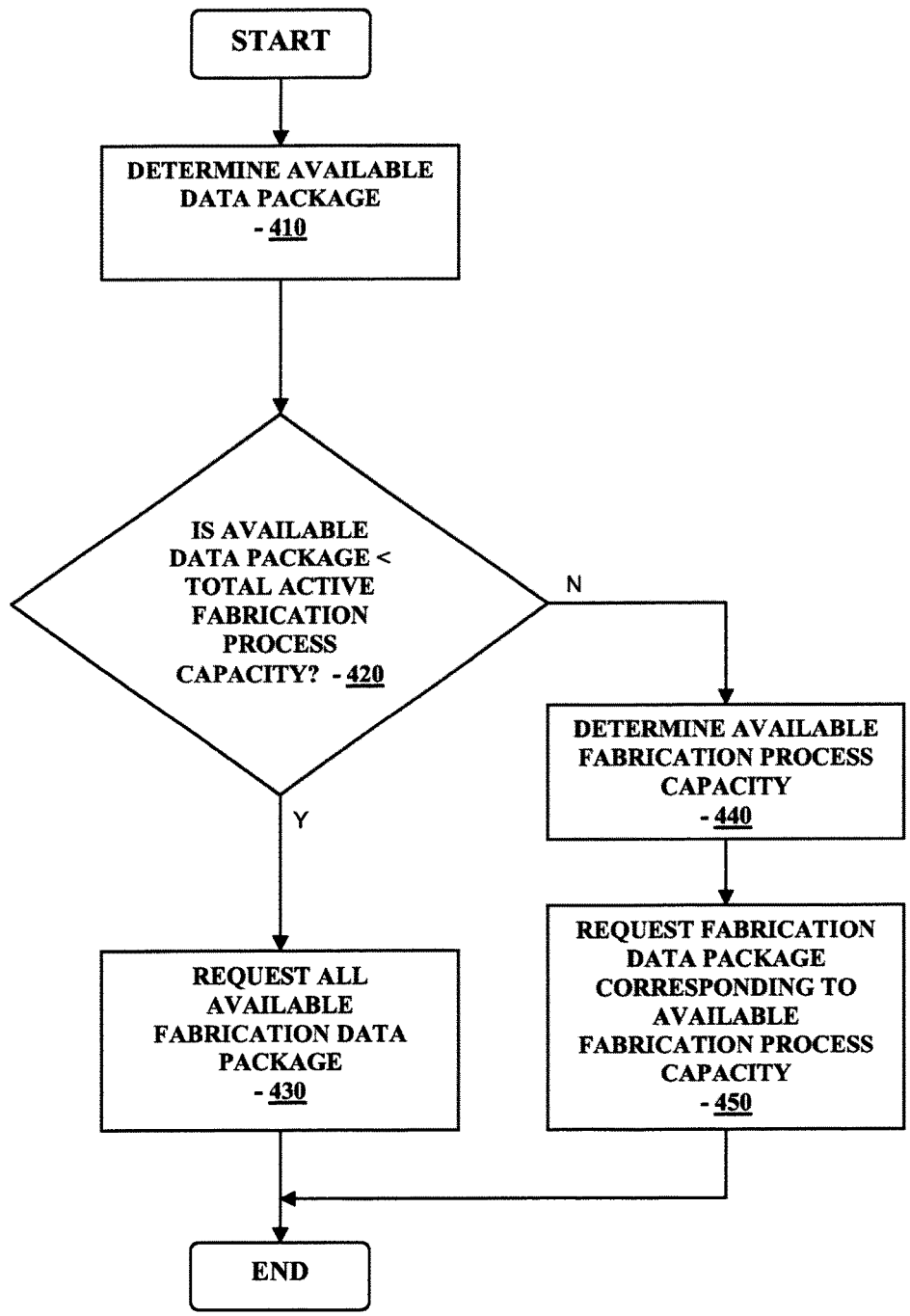
FIG. 4 is a flowchart illustrating the fabrication data package request procedure of FIG. 3 in accordance with one embodiment of the present invention.

FIG. 4 is a flowchart illustrating the fabrication data package request step 330 of FIG. 3 in accordance with one embodiment of the present invention. More specifically, referring to FIG. 4, in one embodiment of the present invention, at step 410, the available fabrication data package for fabrication processing is determined. Thereafter, at step 420, it is determined whether the available fabrication data package is less than the total active fabrication process capacity. If it is determined that the available fabrication data package is less than the total active fabrication process capacity at step 420, then at step 430, all available fabrication data package is requested for fabrication processing. That is, in one embodiment, the central manufacturing terminal 130 (FIG. 1B) may be configured to transmit a request to the remote terminal 120 for all available fabrication data package for fabrication processing by the fabrication system 100.

Referring back to FIG. 4, if at step 420 it is determined that the available fabrication data package is not less than the total active fabrication process capacity, then at step 440, the available fabrication process capacity is determined to estimate, for example, the additional fabrication data package which may be processed in the current manufacturing cycle, and at step 450, the incremental fabrication data package corresponding to the determined available fabrication process capacity is requested for concurrent processing with the active fabrication cycle.

Figure 5:
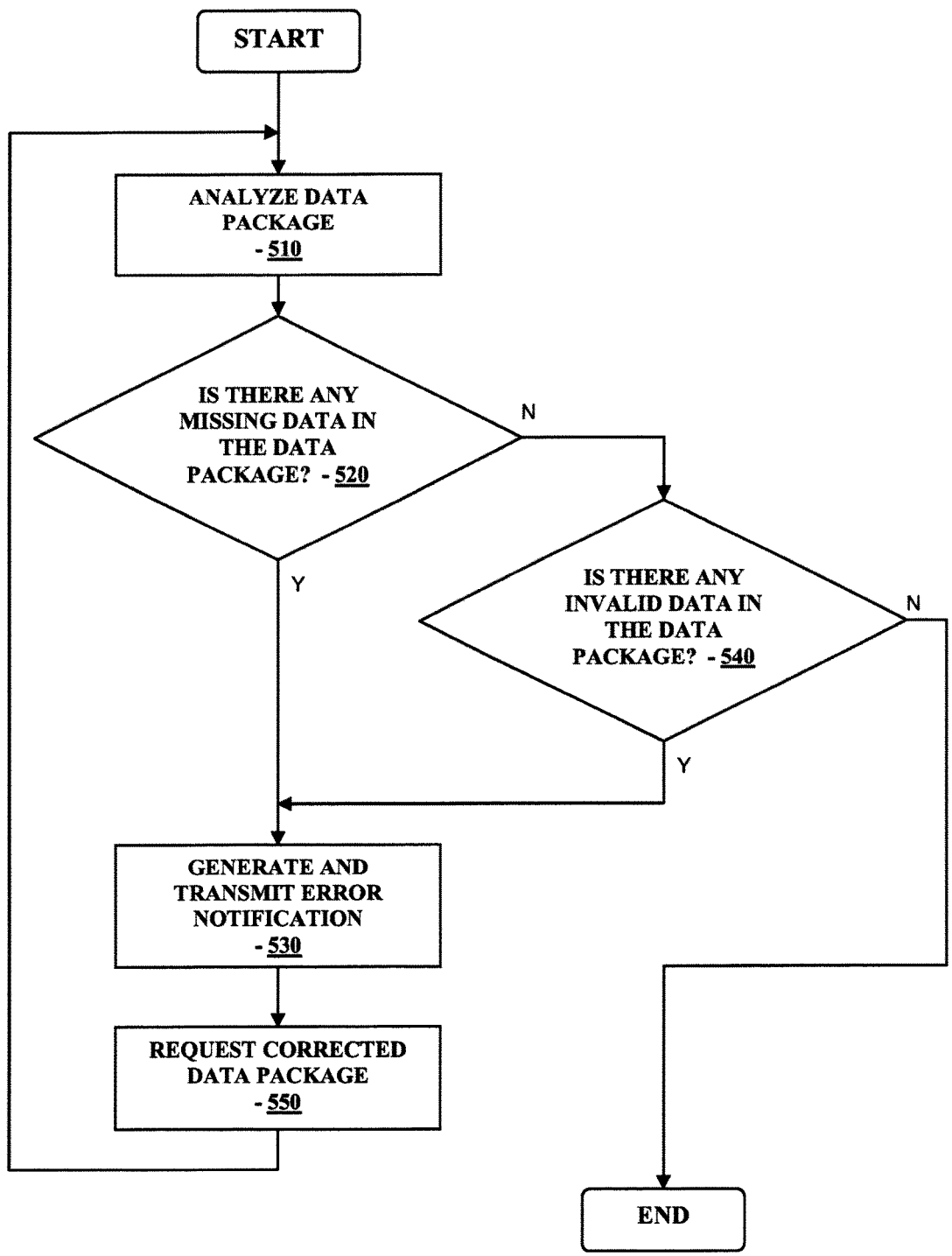
FIG. 5 is a flowchart illustrating the retrieved fabrication data package verification procedure of FIG. 2 in accordance with one embodiment of the present invention.

FIG. 5 is a flowchart illustrating the retrieved fabrication data package verification procedure of FIG. 2 in accordance with one embodiment of the present invention. Referring to FIG. 5, the procedure for verifying the retrieved fabrication data package in one embodiment includes analyzing the retrieved fabrication data package at step 510. Thereafter at step 520, it is determined if there are any missing data in the analyzed fabrication data package. More specifically, in one embodiment, data package associated with each treatment profile is reviewed for any missing treatment profile stage information. For example, for a treatment profile including 20 stages, data package for each of the 20 stages is reviewed to ensure that all associated data related to the 20 stages are received for the treatment profile.

If it is determined that there are missing data in the received fabrication data package, at step 530, an associated error notification is generated and transmitted to, for example, the remote terminal 120 (FIG. 1A). Thereafter, at step 550, the missing (or corrected) data package is requested at step 550. In other words, in one embodiment, in the event that the central manufacturing terminal 130 determines that the fabrication data package received from the remote terminal 120 does not include all of the data associated with the identified treatment profiles for fabrication processing, the central manufacturing terminal 130 is configured to identify the missing data information, and to request the missing data from the remote terminal 120 prior to initiating the fabrication processing of the fabrication data package.

Referring back to FIG. 5, if at step 520 it is determined that there are no missing data in the fabrication data package received, then at step 540 it is determined whether any of the data in the received fabrication data package includes one or more errors. That is, in one embodiment, the central manufacturing terminal 130 is configured to check for the integrity of the data in the received fabrication data package, for accuracy. If there are not invalid or erroneous data identified in the fabrication data package, then the routine terminates. On the other hand, if at step 540 it is determined the received fabrication data package includes invalid data associated with one or more stages of one or more identified treatment profiles for fabrication processing, then as described above, the routine returns to step 530 to generate and transmit one or more associated error notification, and thereafter, at step 540, a corrected data package is requested.

In the manner described above, in one embodiment of the present invention, the central manufacturing terminal 130 may be configured to verify the integrity of the received or retrieved fabrication data package before the fabrication processing cycle is initiated. Accordingly, once the fabrication processing cycle is initiated, in one aspect, it is possible to minimize potential disruption to the fabrication processing cycle based on erroneous or missing data in the fabrication data package.

Figure 6:
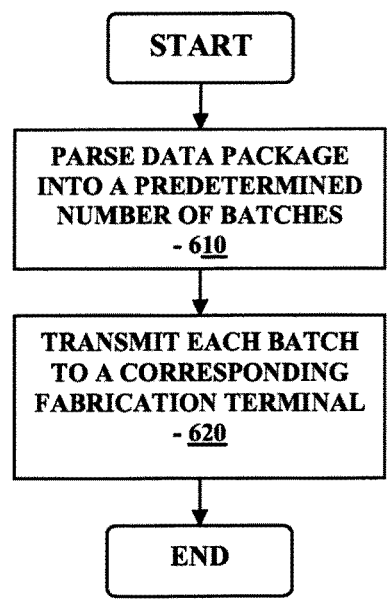
FIG. 6 is a flowchart illustrating fabrication data package processing execution by the central manufacturing terminal of FIG. 1B in accordance with one embodiment of the present invention.

FIG. 6 is a flowchart illustrating fabrication data package processing execution by the central manufacturing terminal of FIG. 1B in accordance with one embodiment of the present invention. Referring to FIG. 6, in one embodiment, the fabrication data package processing is executed by, for example, parsing the fabrication data package into a predetermined number of processing batches at step 620. Thereafter, at step 620, each of the predetermined number of processing batches of the parsed fabrication data package is transmitted to a corresponding one or more fabrication terminals 140A, 140B (FIG. 1A) for processing and execution based on the parsed fabrication data package.

For example, in one embodiment of the present invention, each of the fabrication terminals 140A, 140B may be configured to execute one or more dedicated processes associated with one or more aspects of the fabrication system 100. Accordingly, the central manufacturing terminal 130 is configured to substantially concurrently initiate the execution of one or more processes associated with each of the one or more parsed data packages for each fabrication terminal 140A, 140B. In this manner, fabrication processing by the central manufacturing terminal 130 may be divided into sub-tasks or sub-routines and performed substantially in parallel and concurrently to optimize the fabrication processing cycle.

Figure 7:
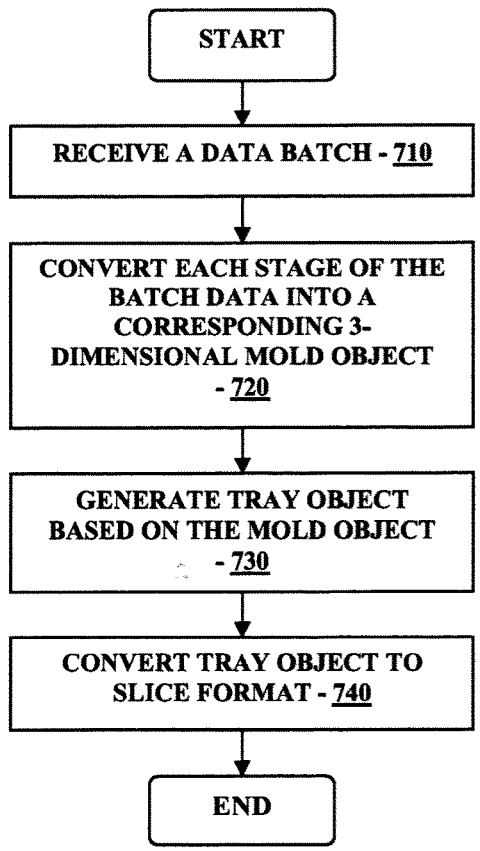
FIG. 7 is a flowchart illustrating fabrication data package processing execution by one or more fabrication terminals of FIG. 1B in accordance with one embodiment of the present invention.

FIG. 7 is a flowchart illustrating fabrication data package processing execution by one or more fabrication terminals of FIG. 1A in accordance with one embodiment of the present invention. More specifically, referring to FIG. 7, at step 710 each of the fabrication terminals 140A, 140B in one embodiment receives a data batch from the central manufacturing terminal 130, and at step 720, is configured to convert each stage of the received data batch into a corresponding three-dimensional mold object data file. In one aspect, each three-dimensional mold object data file may correspond to one stage of a plurality stages of a treatment profile of the fabrication data package. Thereafter, tray object data based on the mold object data file is generated at step 730, which is then converted to slice format data for mold cutting from the tray.

That is, in one embodiment, the one or more fabrication terminals 140A, 140B may be configured to receive one or more data batches from the central manufacturing terminal 130, and to convert the received data batches into a three-dimensional mold object data file which corresponds to the received one or more data batches. Thereafter, the one or more fabrication terminals 140A, 140B may be further configured to generate three-dimensional tray object data which correspond to an optimized layout information of the plurality of mold data (for example, each tray object data file corresponding to one stage of the plurality of stages of the treatment profile) to minimize material wastage and optimize the volume of mold objects that may be provided on each mold tray prior to cutting. After performing the optimized layout of the tray based on the mold objects, the tray object data are converted into a polygonal format, for example, to allow slicing of each mold from the tray.

In one embodiment of the present invention, each of the fabrication terminal 140A, 140B may be configured to perform one or more of the dedicated functions associated with the conversion of each stage of the batch data into a corresponding three-dimensional object data, the generation of the tray object data based on the mold object data, and the conversion of the tray object data into the slice format in the fabrication processing.

Figure 8:
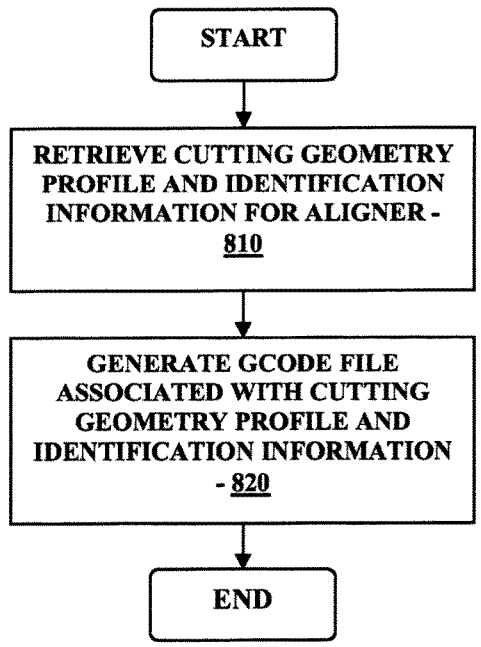
FIG. 8 is a flowchart illustrating the mold object generation procedure of FIG. 7 in accordance with one embodiment of the present invention.

FIG. 8 is a flowchart illustrating the mold object generation procedure of FIG. 7 in accordance with one embodiment of the present invention. More specifically, in one embodiment of the present invention, the conversion of each stage of the batch data into a corresponding three-dimensional mold object data includes retrieving at step 810 a cutting geometry profile and an identification information for a dental aligner associated with each stage of the dental treatment profile in the fabrication data package. Thereafter, a corresponding machine executable data file is (for example, a GCode file) is generated that is associated with the cutting geometry and identification information of each stage of the treatment profile.

Figure 11:
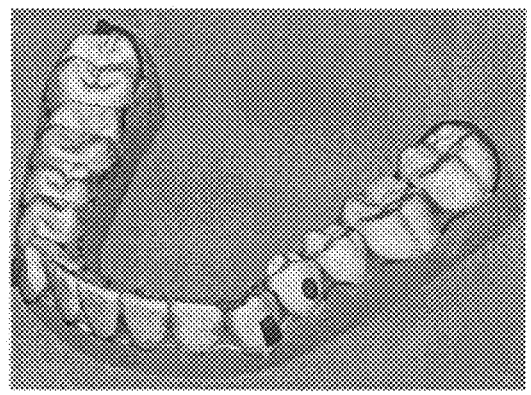
FIG. 11 is a three-dimensional representation of a cutting geometry profile of FIG. 8 in accordance with one embodiment of the present invention.

More particularly, in one embodiment, the one or more fabrication terminal 140A, 140B is configured to generate the machine executable data file which includes the cutting geometry and identification information (for example, the customer identification number, the stage of the treatment profile information, and the like) for each dental appliance for each stage of the treatment profile. For example, FIG. 11 illustrates a three-dimensional representation of a cutting geometry profile, and FIG. 12 illustrates a three-dimensional representation of identification information of a dental appliance in accordance with one embodiment of the present invention.

Figure 9:
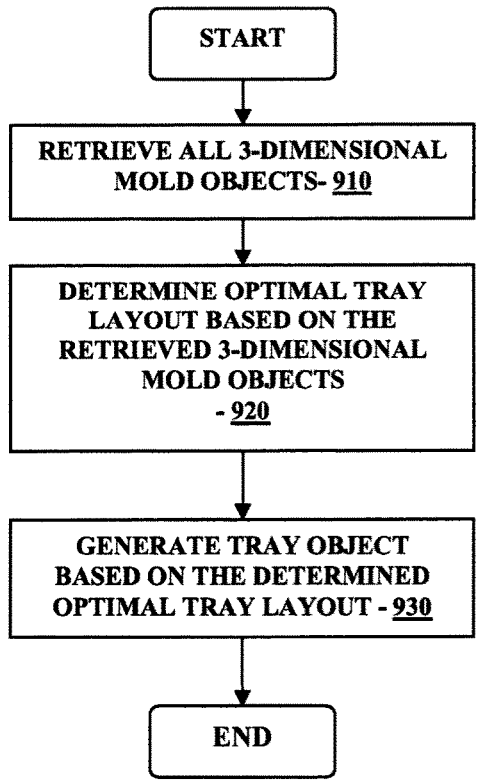
FIG. 9 is a flowchart illustrating the tray object generation procedure of FIG. 7 in accordance with one embodiment of the present invention.

FIG. 9 is a flowchart illustrating the tray object generation procedure of FIG. 7 in accordance with one embodiment of the present invention. Referring now to FIG. 9, in one embodiment, the tray object data is generated based on the three-dimensional mold object by, for example, retrieving all three-dimensional mold object data in the fabrication data package in the fabrication processing cycle at step 910, and at step 910, an optimal tray layout is determined based on the retrieved three-dimensional mold objects data.

For example, referring to FIGS. 13A-13B, visual illustrations of a column oriented and recursive layouts, respectively, of the optimal tray layout are shown in accordance with one embodiment of the present invention. Indeed, in one embodiment of the present invention, the optimal tray layout in one embodiment is determined based on the retrieved three-dimensional mold objects data so as to optimize the spacing and material usage of each dental appliance associated with each stage of each treatment profile associated with the fabrication data package.

Referring back to FIG. 9, upon determination of the optimal tray layout, the tray object file is generated based on the optimized layout information. For example, in FIG. 13A, a three-dimensional column oriented layout of the mold objects are shown in one embodiment, while in FIG. 13B, a three-dimensional recursive layout of the mold objects for batch processing is shown. In this manner, in one embodiment of the present invention, the adjacent columns as shown in FIGS. 13A, 13B are oriented in opposite direction to optimize the tray layout. In one aspect, the tray layout optimization may include a first column layout format that orients the mold objects equally such that the curved segment of the mold object is configured to fit into the opening segment of another mold object (as depicted in the three-dimensional illustration of the tray layout shown in FIGS. 13A, 13B, for example). Alternatively, in a further embodiment, column orientation including an interlocked pair configuration for mold objects may be used such that mold objects are oriented in opposite direction and placed at a predetermined angle. More specifically, in one aspect, the recursive layout as shown in FIG. 13B including a segment of the tray layout rotated by approximately 90 degrees may be used to obtain an optimized tray layout configuration.

Figure 10:
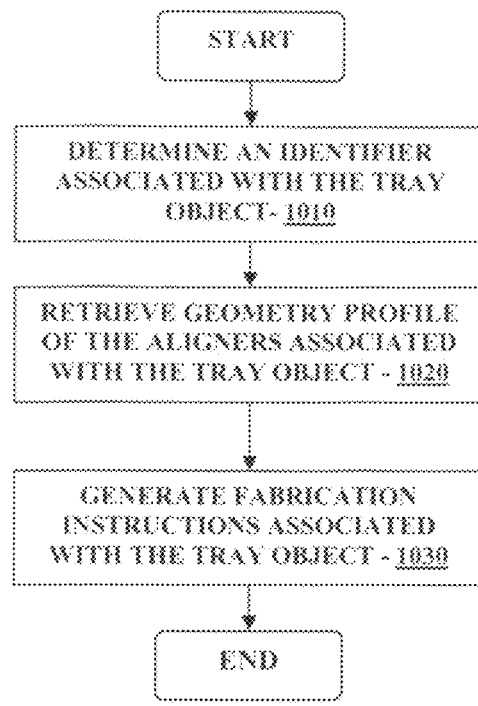
FIG. 10 is a flowchart illustrating the slice format generation procedure of FIG. 7 in accordance with one embodiment of the present invention.

FIG. 10 is a flowchart illustrating the slice format generation procedure of FIG. 7 in accordance with one embodiment of the present invention. Referring to FIG. 10, in one embodiment, the slice format generation procedure includes determining an identifier associated with the tray object at step 1010, and then retrieving geometry profile of the dental appliance such as aligners associated with the mold object in the corresponding tray object at step 1020. Thereafter, at step 1030, one or more fabrication instructions associated with the tray object is generated so as to be executed by the one or more manufacturing machines executing the manufacturing processes associated with the fabrication of the dental appliances corresponding to the fabrication data package.

For example, in one embodiment, for each tray object, the corresponding mold geometries are retrieved and a layout transformation procedure is implemented and converted into the manufacturing machine executable file format such that the mold slicing procedure may be performed for each mold object associated with the one or more tray objects for the treatment profiles associated with the fabrication data package.

In this manner, in particular embodiments, methods and systems are provided for automated or semi-automated manufacturing or fabrication process for high volume and high scale customized items such as dental aligners. More particularly, in accordance with one or more embodiments, there is provided method and system to promptly process treated three-dimensional ("3D") jaw and teeth data to generate, in an automated manner, 3D mold data for manufacturing. In addition, a 3D cutting path may be generated for automated cutting of aligners, and 3D placement data for automated laser marking of aligners, while minimizing resin used to build a mold, minimizing time to build a tray of molds, maximizing automation by reducing manual cutting of aligner, manual laser marking and errors. Accordingly, in particular embodiments, each mold may be uniquely identifiable, generated substantially free of holes, free-floating island structures, or unstable peninsula structures, configured to efficiently use the required resin, and where the molds may be packed efficiently on a tray, and also, laser marks are sufficiently sharp.

As discussed above, in accordance with the various embodiments of the present invention, there are provided method and system for automated fabrication process for high volume customized items where each item includes parameters or configurations that are unique to the particular item. While the description above in provided in conjunction with dental appliances, within the scope of the present invention, the automated fabrication processing may be implemented for the manufacturing of any high volume customized items including, for example, customized footwear each configured to fit a unique customer's feet dimensions, customized apparel, customized eyewear, or any other customized consumable or other goods where mass, high volume production generally requires customized tooling requirements for the manufacturing machines.

A method of providing volume manufacturing of items in accordance with one embodiment of the present invention includes receiving a data package including a to plurality of manufacturing parameters, each of the plurality of manufacturing parameters associated with a unique item, verifying the received data package, and implementing a manufacturing process associated with the received data package.

The method in one aspect may further include generating one or more notification associated the data package.

Moreover, in a further aspect, receiving the data package may include determining a current active processing capacity based on the received data package, and retrieving additional data package for implementation of the manufacturing process substantially concurrently with the received data package, where the additional data package may be retrieved when the current active processing capacity is not optimized based on the received data package.

Moreover, verifying the received data package in a further aspect may include detecting an error condition associated with one or more of the plurality of manufacturing parameters, and generating an error notification associated with the detected error condition, where generating error notification in one embodiment may include requesting an updated data package, and receiving an updated data package without the detected error condition.

The detected error condition may include one or more of a missing data, or an invalid data of the data package.

Moreover, in a further aspect, implementing the manufacturing process may include parsing the verified data package, and generating one or more object files based on the parsed data package, each of the one or more object files associated with a corresponding one or more manufacturing routine, where one or more manufacturing routine may be a dedicated routine associated with the manufacturing process, and further, where the dedicated routine may include one of a three-dimensional data generation associated with the unique item, or a three-dimensional data generation associated with a physical layout of the unique item.

In still another aspect, each of the one or more manufacturing routine may be executed substantially concurrently.

The unique item in one aspect includes a dental appliance, where the dental appliance may include a dental aligner.

A method of providing high volume manufacturing process in accordance with another embodiment of the present invention includes receiving a batch data associated with the manufacturing of a plurality of unique items, and generating one or more object files associated with each of the plurality of unique items. In a further aspect, the batch data may be associated with one or more dedicated processes for the manufacturing of the plurality of unique items.

Additionally, the one or more object files may include one or more three-dimensional object data, each associated with the one or more of the plurality of unique items, where the one or more three-dimensional object data may include one or more of a geometry parameter, an identification parameter, or a layout parameter.

A system for high volume manufacturing of customized items in accordance with still another embodiment includes a remote terminal, and a storage unit, a controller unit operatively coupled to the storage unit, and configured to receive from the remote terminal, a data package including a plurality of manufacturing parameters, each of the plurality of manufacturing parameters associated with a unique item, the controller unit further configured to verify the received data package and to implement a manufacturing process associated with the received data package.

The controller unit may be further configured to transmit one or more notification associated the data package to the remote terminal.

In a further aspect, the controller unit may also be configured to determine a current active processing capacity based on the received data package, and to retrieve additional data package from the remote terminal for implementation of the manufacturing process substantially concurrently with the received data package, where the controller unit may be configured to retrieve the additional data package from the remote terminal when the current active processing capacity is not optimized based on the received data package.

In another aspect, the controller unit may be further configured to detect an error condition associated with one or more of the plurality of manufacturing parameters, and to transmit an error notification associated with the detected error condition to the remote terminal, where the controller unit may additionally be configured to request an updated data package from the remote terminal, and to receive an updated data package from the remote terminal without the detected error condition.

In another aspect, the system may further include a fabrication terminal operatively coupled to the controller unit, the fabrication terminal configured to receive the verified data package, to parse the verified data package, and to generate one or more object files based on the parsed data package, each of the one or more object files associated with a corresponding one or more manufacturing routine, where each of the one or more manufacturing routine may be a dedicated routine associated with the manufacturing process.

Moreover, the dedicated routine may include one of a three-dimensional data generation associated with the unique item, or a three-dimensional data generation associated with a physical layout of the unique item.

The various processes described above including the processes performed by the central manufacturing terminal 130, the remote terminal 120, and fabrication terminals 140A, 140B (FIG. 1A) in the software application execution environment in the fabrication system 100 including the processes and routines described in conjunction with the Figures may be embodied as computer programs developed using an object oriented language that allows the modeling of complex systems with modular objects to create abstractions that are representative of real world, physical objects and their interrelationships. The software required to carry out the inventive process, which may be stored in the memory or data storage unit 130A of the central manufacturing terminal 130 (and/or other equivalent storage units of the respective one or more remote terminal 120 and fabrication terminals 140A, 140B, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for manufacturing a plurality of unique items on a fabrication tray, comprising the steps of:
    (a) receiving, by a processing unit, a data batch including manufacturing data associated with a plurality of stages of a treatment profile, each of the plurality of stages of the treatment profile corresponding to one of the plurality of unique items; and (b) operating the processing unit to:
  (1) convert the manufacturing data of the data batch into a plurality of object data files, each of the object data files including three-dimensional object data associated with one of the plurality of stages of the treatment profile; and
  (2) generate a tray data file based on the object data files, the tray data file including optimized layout information representing an optimized spacing and orientation of the plurality of unique items to be manufactured on the fabrication tray; and
(c) manufacturing and holding the plurality of unique items on the fabrication tray in accordance with the optimized layout information and the three-dimensional object data in each of the object data files.

2. The method of claim 1, wherein the data batch further comprises data corresponding to one or more dedicated processes for the manufacturing of the plurality of unique items on the fabrication tray.

3. The method of claim 1, wherein the plurality of unique items includes a plurality of molds for dental appliances, wherein each of the molds is manufactured in accordance with the manufacturing data associated with one of the stages of the treatment profile.

4. The method of claim 1, wherein the optimized layout information further represents an optimized material usage for manufacturing the plurality of unique items on the fabrication tray.

5. The method of claim 1, wherein the manufacturing is done by a rapid prototyping method.

6. The method of claim 1, wherein the processing unit is further operated to:
generate slice format data based on the optimized layout information in the tray data file.

7. The method of claim 1, wherein the generation of the tray data file comprises:
  (2)(A) retrieving the object data files converted from the manufacturing data of the data batch;
  (2)(B) determining the optimized spacing and orientation of the plurality of unique items to be manufactured on the tray based on the retrieved object data files; and
  (2)(C) generating the tray data file based on the determined optimized spacing and orientation.

8. The method of claim 1, further comprising the step of:
  (d) removing the manufactured items from the fabrication tray.

9. The method of claim 1, wherein the optimized spacing and orientation provides a column-oriented layout.

10. The method of claim 9, wherein each of the unique items has a curved segment, wherein the column-oriented layout includes a plurality of columns of the unique items, wherein the unique items in each column are oriented with their curved segments arranged in a uniform direction, and wherein the unique items in adjacent columns have their curved segments arranged in opposite directions.

11. The method of claim 9, wherein each of the unique items has a curved segment, wherein the column-oriented layout includes a plurality of columns of the unique items, and wherein each column comprises a plurality of pairs of the unique items, with the items in each pair having curved segments arranged in opposite directions.

* * * * *